(12) United States Patent
Skurdalsvold et al.

(10) Patent No.: US 6,681,720 B1
(45) Date of Patent: Jan. 27, 2004

(54) WIRE CAGE

(75) Inventors: Scott A. Skurdalsvold, Arlington, TX (US); Donald E. Spears, II, Joshua, TX (US); Michael A. Foster, Corinth, TX (US); Mike Harper, Fort Worth, TX (US); Ralph Van Skiver, Mansfield, TX (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 49 days.

(21) Appl. No.: 10/136,677

(22) Filed: May 1, 2002

(51) Int. Cl.[7] .................. A01K 31/08; A01K 31/10; A01K 1/00
(52) U.S. Cl. ............... 119/474; 119/481; 119/461; 119/462; 119/480
(58) Field of Search ................ 119/474, 462, 119/480, 498, 481, 461, 459, 482

(56) References Cited

U.S. PATENT DOCUMENTS

| 2,456,419 | A | * | 12/1948 | Jackson et al. ............ 220/6 |
| 2,892,562 | A | | 6/1959 | Smithson |
| 3,556,058 | A | | 1/1971 | Smiler |
| 3,749,061 | A | * | 7/1973 | Connelly .................. 119/500 |
| 3,896,766 | A | | 7/1975 | Martin |
| 4,016,833 | A | | 4/1977 | Ray |
| 4,484,540 | A | | 11/1984 | Yamamoto |
| 4,762,085 | A | | 8/1988 | Ondrasik |
| 4,763,606 | A | | 8/1988 | Ondrasik, II |
| 5,476,066 | A | * | 12/1995 | Hoffman ................... 119/482 |
| 5,544,619 | A | | 8/1996 | Braun |
| 5,549,073 | A | | 8/1996 | Askins et al. |
| 5,626,098 | A | | 5/1997 | Askins et al. |
| 5,660,291 | A | | 8/1997 | Dash |
| 5,669,331 | A | | 9/1997 | Richmond |
| 5,803,018 | A | * | 9/1998 | Liou ....................... 119/461 |
| 6,192,834 | B1 | | 2/2001 | Kolozsvari |
| 6,293,229 | B1 | * | 9/2001 | Edstrom, Sr. ............. 119/482 |
| 6,484,672 | B1 | * | 11/2002 | Versaw .................... 119/751 |

FOREIGN PATENT DOCUMENTS

| DE | 29704591 U1 | * | 6/1997 | .......... A01K/31/02 |
| FR | 2345074 A | * | 11/1977 | .......... A01K/31/08 |
| GB | 2366177 A | * | 3/2002 | .......... A01K/1/02 |

* cited by examiner

Primary Examiner—Charles T. Jordan
Assistant Examiner—John W. Zerr
(74) Attorney, Agent, or Firm—Locke Liddell & Sapp LLP (57) ABSTRACT

A wire cage operable between an expanded position and a folded position includes a top wall and a bottom wall, a first sidewall, a second sidewall, a front wall and a rear wall attach to the bottom and top walls. The front and rear walls contain rounded sides. The cage includes an entrance door. A pass through door is mounted on the entrance door. In order to open the pass through door, the entrance door must be closed and locked. The cage top wall optionally contains a top wall door hinged on the edge of the top wall so that the user can easily access the cage from the top wall. The top door can be rotated so that it rests flush with the cage sidewall. A pan is inserted over the bottom surface.

42 Claims, 7 Drawing Sheets

WIRE CAGE

TECHNICAL FIELD OF THE INVENTION

This invention relates to animal cages. More particularly, this invention relates to a collapsible cage for containing a pet.

BACKGROUND OF THE INVENTION

Oftentimes pet owners desire to place their pets inside a temporary housing to separate a pet from its normal environment. In response, various cage designs have been created, many of which are bulky and consume a large area of space while being stored. In order to overcome this problem, collapsible cages have been devised to allow pet owners to easily transport and store the cage in a compact fashion. However, many of these collapsible wire cage designs are burdensome to use as they are difficult to erect for use or to fold after use. Further, these wire cage designs have sharp corners that can rip clothing and scrape legs of pet owners and hook or catch onto cage walls during assembly. Most importantly, because many of the components must be detachable in order for the cage to fully collapse, the structural integrity and strength of the cage is severely compromised. This can result in pets escaping from the cage interior. Additionally, many cage designs are constructed in such a way that when persons desire to feed or provide water for their pet, the user must open the large access doors to the cage to deliver the food or Water. This configuration provides a substantial risk that a pet may unexpectedly escape while the pet owner is feeding the pet. Finally, many locking mechanisms on current cage designs can be accidentally unlocked by pets that are inside the cage or are simply difficult for pet owners to operate.

A need exists for an improved collapsible cage that addresses these deficiencies.

SUMMARY OF THE INVENTION

The present invention relates to a collapsible wire cage for a household pet. The wire cage can be positioned between an expanded position, to form an enclosure to house the pet, and a folded position, where the wire cage is compact for ease of transport and storage. While in the expanded position, a front wall, a rear wall, a first sidewall, a second sidewall and a top wall are interconnected above a base wall so as to prevent a pet escaping from the cage interior. The front and rear walls contain rounded sides to avoid sharp corners that can often rip clothing, scrape the legs of pet owners, etc. Further, rounded sides simplify assembly/disassembly of the cage because the sides are able to slide against and not interfere with the sidewalls when transitioning the front and rear walls between the folded and expanded positions.

The present invention contains multiple wire lock devices mounted on the top wall to connect and secure the front and rear walls to the top wall in an upright position. The wire locks provide additional stability to the cage while configured in the expanded position as they prevent the pet from collapsing the cage walls inward. This reduces the likelihood of the pet escaping or injury to the pet.

The top wall contains a top door to allow the pet owner to access the cage through the top surface. The top door is hinged along the top surface edge so as the door is fully opened the door can rest flush with the side of the kennel. While in this position, the cage can be placed adjacent a room wall and used as a puppy pen.

The wire cage front wall contains an entranceway door to allow the pet to enter and exit the cage interior. The entrance door is locked by at least one locking mechanism so as to prevent the pet from escaping the cage interior. The locking mechanism contains a latch bolt that is offset with a latch handle so that the latch handle only has to be rotated perpendicular to the cage door in order to unlock the latch. Because the handle is perpendicular to the face of the cage door, the handle provides the pet owner with additional leverage to open and/or close the cage door. In current cage designs, the latch must be rolled up to 180 degrees which oftentimes results in fingers and knuckles being pinched and/or scraped. Further, the handle cannot be used to open and close the door.

A second door, or a pass through door, is mounted on the entrance door to allow access inside the cage interior without opening the entrance door. The pass through door is pivotably hinged onto the entrance door and contains a locking mechanism to lock the door in the closed position. The pass through door is sufficiently sized in order to allow the pet owner access to the cage interior to insert a water or food bowl without allowing the pet to escape while the pass through door is open. In order to open the pass through door, the entrance door must be closed and the locking mechanism on the entrance door must be locked. Thus, when the pet owner attempts to feed the pet, it is difficult for the pet to escape and the pet owner is always assured that the entrance door is locked and closed.

When transporting or storing the wire cage, the cage can be placed in a folded position. In the folded position, the front and rear walls are disconnected from the top wall and collapse inside the cage interior. The rounded sides on the front and rear walls are sized to slide against the sidewalls without interfering or hooking onto the sidewalls. The top wall and sidewalls are then folded and stacked above the collapsed front and rear walls.

The base wall can be configured to receive a removable pan to support the pet while inside the cage interior. The removable pan contains a moat to allow drainage of urine. The base wall is defined by a bottom surface having multiple protrusions to support the removable pan. The protrusions are taller in the middle portion of the bottom surface and shorter towards the bottom surface edges. Thus, when the removable pan is placed inside the base portion, the raised center portion causes the pan to slope downward thereby causing the edge portions of the pan to be lower than the middle portion of the pan. As a result, any urine excreted by the pet while inside the cage drains toward the edge and is collected by the moat. This provides a dry containment area for the pet.

BRIEF DESCRIPTION OF THE DRAWINGS

For a more complete understanding of the present invention and for further advantages thereof, reference is now made to the following description of the preferred embodiments taken in conjunction with accompanying drawings in which.

DESCRIPTION OF THE PREFERRED EMBODIMENTS

Figure 1:
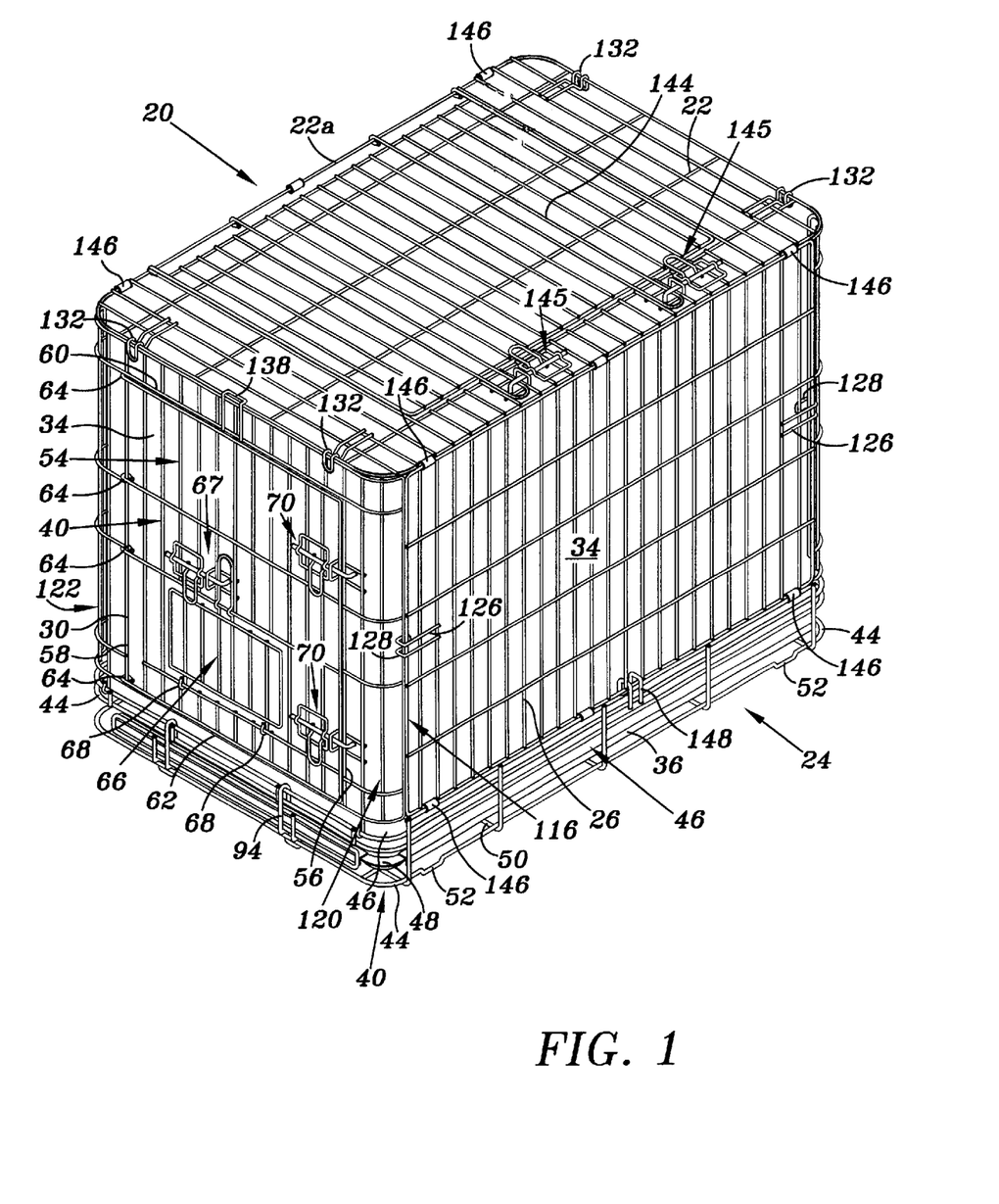
FIG. 1 is a perspective view of the wire cage kennel.
Figure 6:
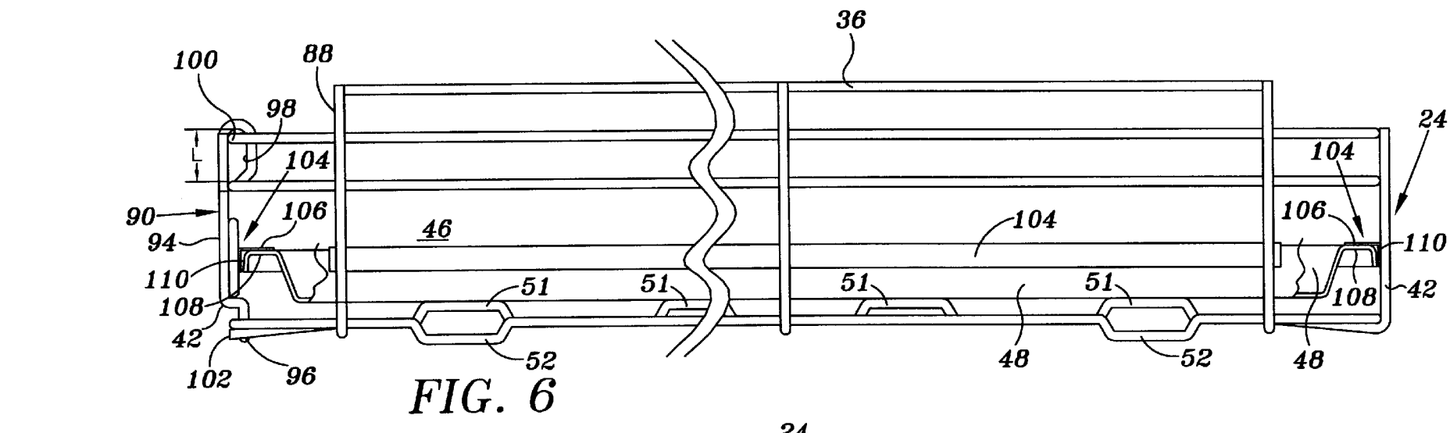
FIG. 6 is a side elevation view of the base portion illustrating the removable pan, the support extensions and the base portion door to remove the pan.
Figure 7:
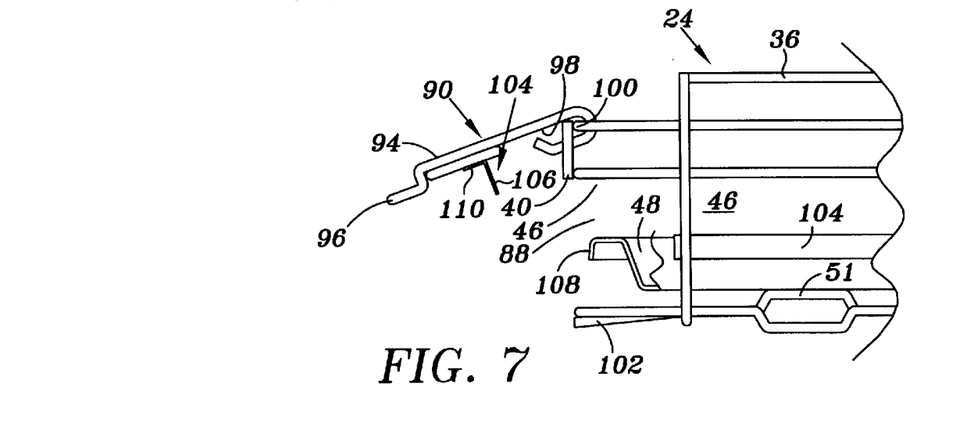
FIG. 7 is a partial side elevation view of FIG. 6 showing the base portion door rotated upward to provide an opening to remove the pan.
Figures 10, 11:
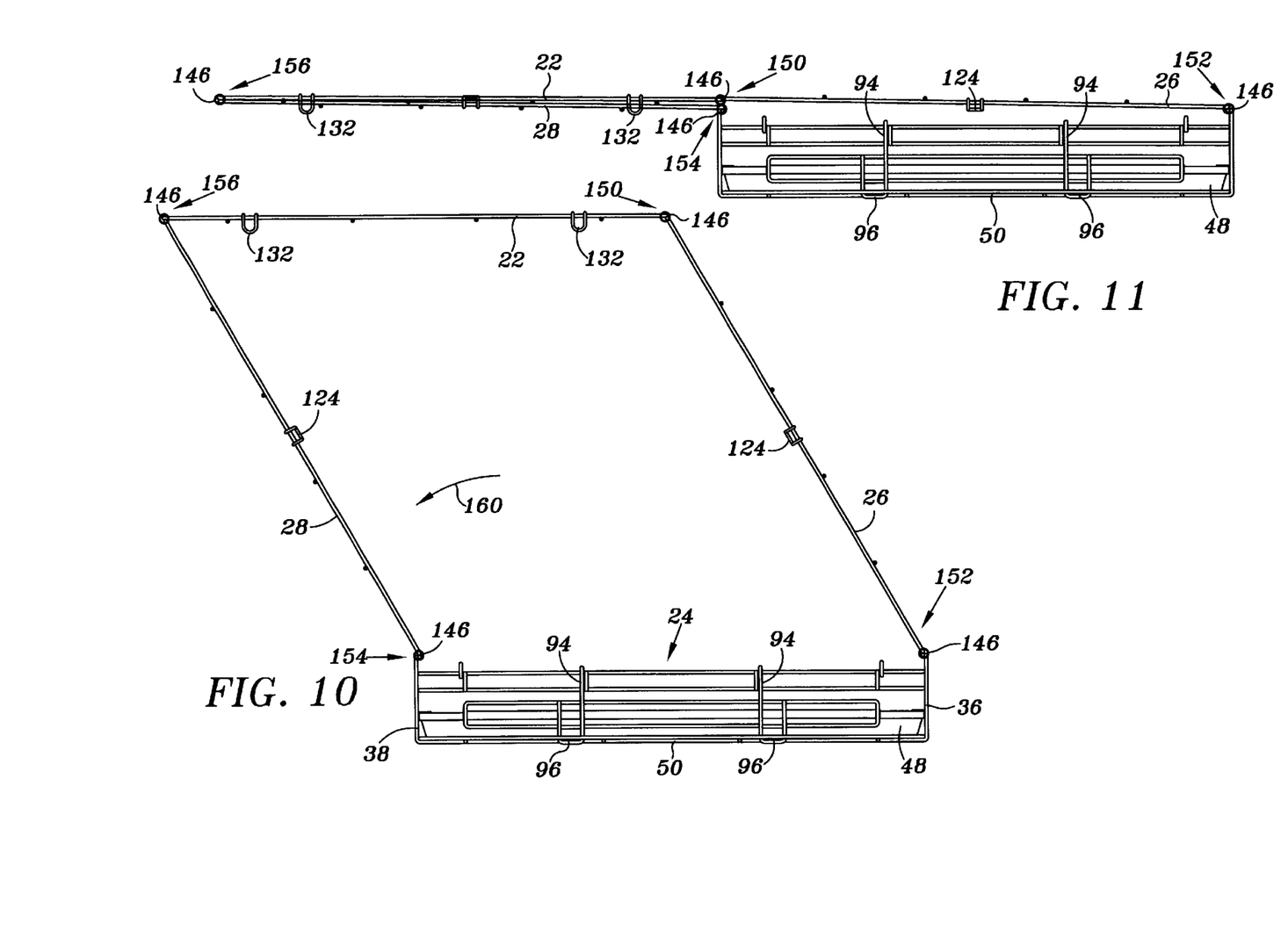
FIG. 10 is a front elevation view showing the sidewalls and top surface partially collapsed.
FIG. 11 is a side elevation view showing sidewalls collapsed horizontally.

A collapsible cage 20 is provided positionable between an expanded position (FIG. 1) and a folded position (FIG. 13) so that cage 20 can be stored using minimal space and easily transported. Referring to FIG. 1, cage 20 contains a top wall 22, a bottom portion 24, a first sidewall 26, a second sidewall 28 (FIG. 8), a front wall 30 (FIG. 1) and a rear wall 32 (FIG. 8) to define a cage interior 34. For purposes of clarity, second sidewall 28 and rear wall 32 have been removed from FIG. 1. Bottom portion 24 provides a rigid base for walls 26, 28, 30 and 32 which are pivotably connected thereto. Bottom portion 24 contains a bottom wall 50, a base sidewall 36 and a base sidewall 38 (FIG. 10). Sidewalls 36 and 38 are connected to a base front wall 40 and base rear wall 42 (FIG. 6) at curved sides 44 to form a receiving area 46 for a removable pan 48 (FIGS. 6 and 7). Extensions or feet 52 are provided at each corner of bottom wall 50 to raise the bottom wall above a support surface or floor (not shown). Each extension 52 can optionally be fitted with a rubber covering (FIG. 2) in order to prevent extensions 52 from marking on the support surface or floor while also providing sufficient frictional engagement with the support surface or floor to prevent cage 20 from sliding while being used. Alternatively, bottom portion 24 can be configured without a receiving area such that walls 26, 28, 30 and 32 pivotably connect directly to bottom wall 50. As used herein, "bottom wall" shall refer to either configuration, a wall with or without walls 36, 38, 40 and 42.

Figure 2:
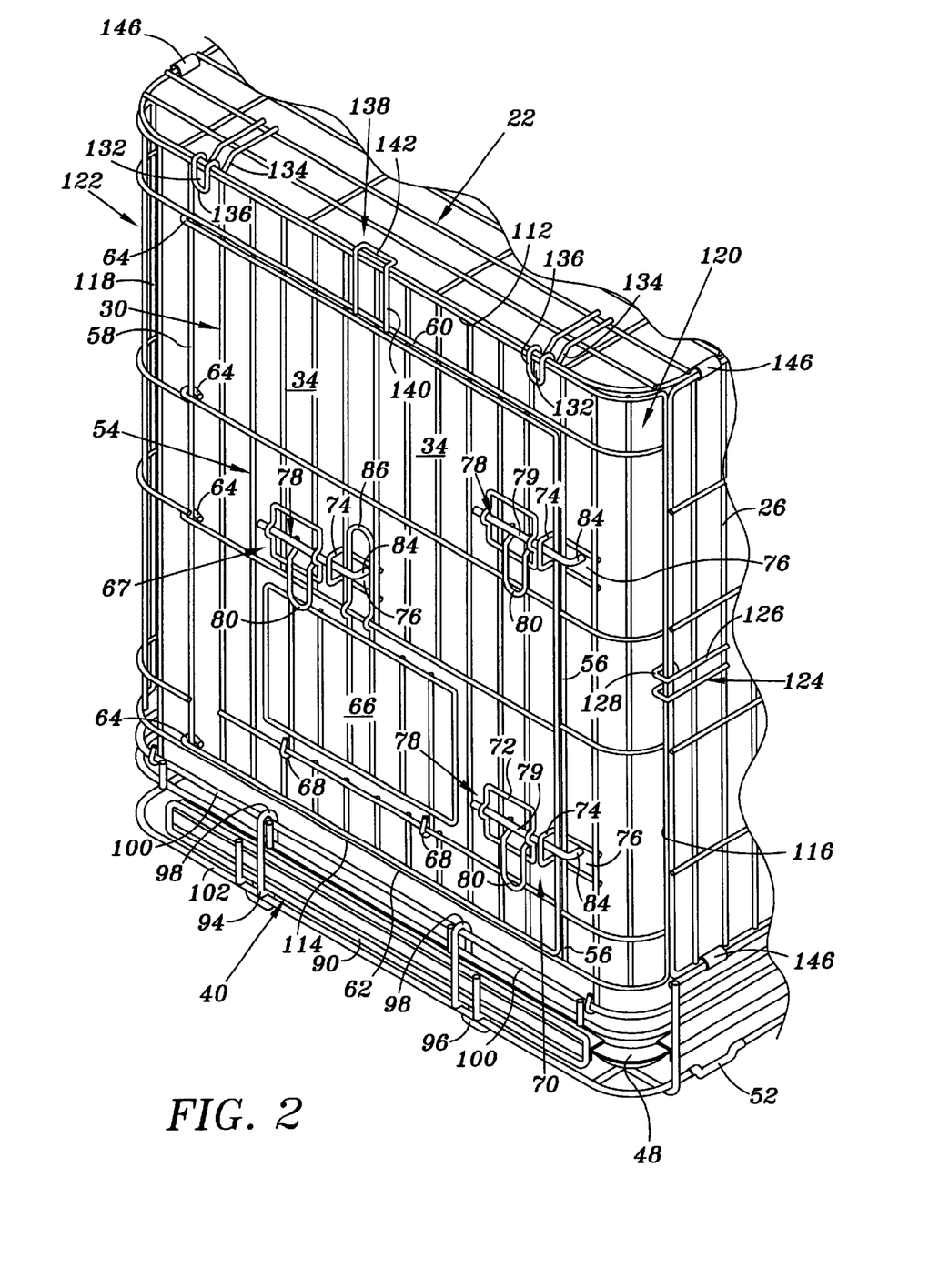
FIG. 2 is a perspective view of the front wall of the wire cage kennel illustrating the door features and the connecting configuration of the front wall to the top surface and sidewall.

As seen in FIG. 2, front wall 30 contains an opening for an entrance door 54. The opening is defined by first side edge 56, second side edge 58 and a top and bottom edge 60 and 62 to allow the pet access inside cage interior 34. Door 54 is pivotably mounted to wall 30 along second edge 58 by looped ends 64, which attach to wall 30 to form a door hinge. This configuration allows the door to be pivoted between an open and closed position.

Entrance door 54 further contains a pass through door 66 to allow the pet owner access inside cage interior 34 without opening entrance door 54. Pass through door 66 is sufficiently sized to insert a traditional sized water or food bowl inside cage interior 34 without opening entrance door 54. As explained in greater detail below, pass through door cannot be opened unless entrance door 54 is closed and locked; therefore, it is difficult for a pet to escape cage interior 34 when the pet owner is providing food or water for the pet. Pass through door 66 is hinged onto entrance door 54 by looped ends 68, such that when entrance door 54 is closed and locked and pass through door 66 is unlocked, pass through door 66 can rotate horizontally in order to allow access inside cage interior 34.

Figures 3, 4, 5:
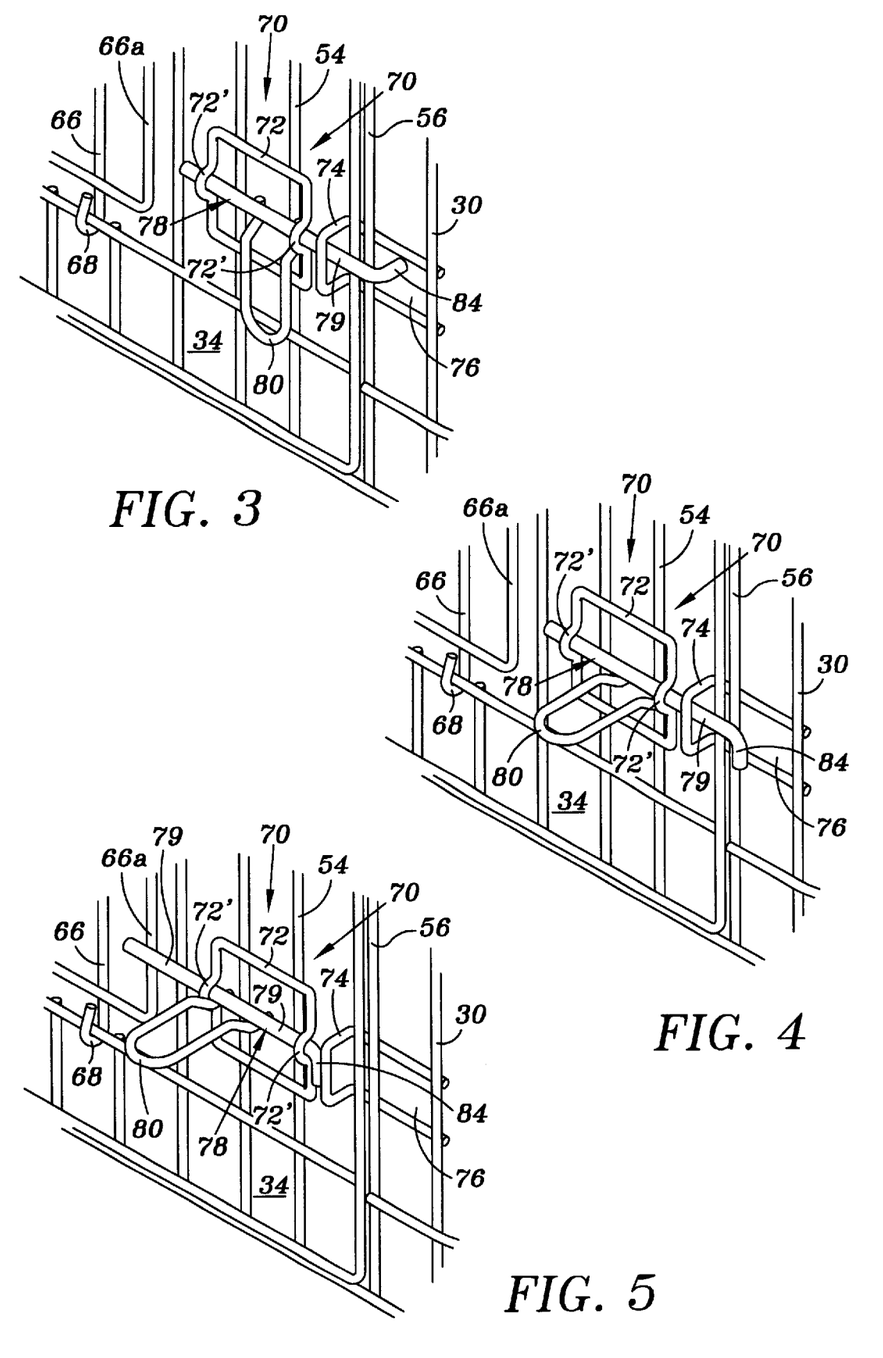
FIG. 3 is a perspective view of the door locking device illustrated in the locked position.
FIG. 4 is a perspective view of the door locking device partially rotated for unlocking the door.
FIG. 5 is a perspective view of the door locking device illustrated in the unlocked position.

FIG. 3 illustrates entrance door 54 containing a locking mechanism 70 to lock door 54 to cage 20 and to prevent the pet from opening door 54 while inside cage interior 34. Locking mechanism 70 contains a base support member 72 connected to entrance door 54, a receiving member 74 connected to first edge 56 and a locking slot 76, defined by the base portion of receiving member 74 and the vertical side members on front wall 30. Base support member 72 supports a latch 78 in recessed areas 72' to allow lateral and rotational movement of latch 78. Latch 78 contains a handle 80 to rotate and slide latch 78 when it is desired to lock or unlock the door. Latch 78 includes a transverse member 79 having a curved end 84 that projects in a plane perpendicular to handle 80. As seen in FIG. 3, entrance door 54 is locked such that latch 78 extends through a keeper or receiving member 74 and curved end 84 extends into locking slot 76. In this position, transverse member 79 is prevented from moving laterally and separating from receiving member 74 since end 84 abuts against edge 56 to maintain door 54 locked.

Referring to FIG. 4, to unlock and open entrance door 54, handle 80 is rotated upward ninety degrees so that it is positioned perpendicular to door 54. The movement of handle 80 rotates curved end 84 ninety degrees downward to remove curved end 84 from locking slot 76. Once curved end 84 is removed, handle 80, while remaining in the perpendicular position, is moved laterally so that curved end 84 slides through receiving member 74 (FIG. 5). The perpendicular positioning of handle 80 allows the pet owner to easily grasp handle 80 without scraping his or her fingers and/or knuckles against the cage while also providing sufficient leverage to open entrance door 54. Once curved end 84 is removed from receiving member 74, door 54 is unlocked and can be pivoted to the open position.

When door 54 is unlocked, transverse member 79 extends to contact door 66 along edge 66a (FIG. 5) to block and thereby prevent pass through door 66 from opening. In order to open pass through door 66, entrance 54 must be locked (FIG. 3) such that transverse member does not contact edge 66a to thereby unblock door 66. This configuration permits the pet owner to only open pass through door 66 to service the interior when door 54 is locked and the pet cannot escape through an open entrance door 54. In the embodiment shown in FIGS. 1 and 2, an upper and lower locking mechanism 70 are illustrated on entrance door 54; however, it should be realized by one of ordinary skill that a greater or fewer number of locking mechanisms can be placed on door entrance 54.

A pass through door locking mechanism 67 (FIG. 2) locks pass through door 66 in a similar fashion to that discussed for entrance door 54. To open pass through door 66, handle 80 is rotated 90 degrees and curved end 84 is removed from slot 76. Handle 80 is then laterally moved so that curved end 84 slides through receiving member.74 so that cross member 78 no longer supports a door extension 86. When latch 78 is in this position, pass through door 66 can rotate downward to permit access through the pass through opening.

Referring specifically to bottom portion 24 in FIGS. 2, 6 and 7, bottom wall 50 is provided to support removable pan 48. Removable pan 48 can be fabricated from a plastic or a metal material with sufficient strength to withstand the weight of a large or small pet while inside cage 20. Preferably, removable pan 48 contains a moat around the pan edges so as to maintain a dry floor in the event the pet urinates. Bottom wall 50 contains a series of equally spaced raised protrusions 51 throughout the entire wall 50. Protrusions 51 located in the center portion of bottom wall 50 are taller than protrusions 51 located on the edges of bottom wall 50 so that as pan 48 is placed on bottom wall 50, the protrusions 51 raise the pan in the center portion above wall 50 to create a downwardly sloped surface to direct any urine excreted by the pet to the edges of pan 48, where the moat is located.

Referring to FIGS. 2, 6, and 7, base portion front wall 40 contains a door opening 88 extending along the length of front wall 40 for receiving a door 90. Door opening 88 is sufficiently sized such that pan 48 can be inserted or removed through the opening 88 while door 90 is rotated around top edge 100 and in the open position. Cage 20 can optionally contain a hook mechanism (not shown) to maintain and hold door 90 in the open position when pan 48 is being inserted or removed from receiving area 46. Door 90 contains vertical support members 94 having a bottom extension 96 and a top loop portion 98 to connect door 90 to top edge portion 100. Loop portion 98 is sufficiently sized a length "L" to permit door 90 to be lifted so that extension 96 is raised above edge 102 to permit rotation of door 90 between a closed position (FIG. 6) and an open position (FIG. 7).

Referring specifically to FIGS. 6 & 7, bottom portion 24 includes a channel lock member 104 located on each wall 36, 38, 40 and 42 to secure pan 48 in position while placed inside receiving area 46. Channel lock member 104 is most preferably an "L" shaped bracket that is attached to each wall of bottom portion 24 such that a top lip 106 covers pan edge 108 around the pan's perimeter and a side lip 110 is adjacent the pan edge to prevent lateral movement of pan 48. In addition to securing pan 48 in position, channel lock 104 prevents a pet from chewing or destroying pan edge 108.

Referring to FIG. 2, walls 26, 28, 30 and 32 (walls 28 and 32 not shown) are interconnected to house a pet inside interior 34. Front wall 30 contains a top edge 112, a bottom edge 114, first side edge 116 and a second side edge 118. First and second side edges 116 and 118 are connected to sidewalls 26 and 28 by sidewall latches 124. Referring to first sidewall 26 adjacent front wall 30, sidewall latch 124 contains a base portion 126 that connects to sidewall 26 and a hook portion 128 containing a curved end to create a receiving area to engage first side edge 116 when cage 20 is in the expanded position. Sidewall latches 124 are located on each cage so corner of cage 20 to connect walls 30 and 32 to walls 26 and 28 in the expanded position. Front wall 30 contains rounded sides 120 and 122 to prevent injury to pets and owners resulting from sharp corners. Additionally, rear wall 32 contains rounded sides 120 and 122 and is in mirror image to front wall 30. As discussed in further detail below, rounded sides 120 and 122 assist the pet owner during assembly of cage 20 as the curved sides will slide over and not interfere with sidewalls 26 and 28 when transitioning walls 30 and 32 between the collapsed and extended positions.

Top wall 22 is connected to front wall 30 along top edge 112 so that wire locks 132 engage top edge 112 when cage 20 is in the expanded position. Wire lock 132 is positioned along the edge 112 to prevent a pet from pulling front and rear walls 30 and 32 inside cage interior 34 and potentially harming the pet. Further, wire lock 132 also prevents the pet from pushing cage walls 30 and 32 outward in order to escape cage interior 34. As seen in FIG. 2, wire lock 132 is formed by an interior depression 134 and an exterior hook 136 so that as top edge 112 is aligned inside wire lock 132, interior depression 134 prevents front wall 30 from collapsing inside cage interior 34 and the exterior hook 136 prevents front wall 30 from folding outward from cage interior 34. Top wall 22 contains at least one wire lock 132, however, it is preferable to have multiple wire locks 132, as seen in FIG. 1.

A latch 138, mounted on top edge 112, provides additional structural support to, cage 20 by preventing front wall 30 from collapsing inside interior 34. Referring to FIG. 2, latch 138 contains a vertical base portion 140 connected to front wall 30 and a top hook 142, which extends horizontally over edge 112 and top wall 22 to prevent separation of top wall 22 from front wall 30. An identical latch 136 is mounted on rear wall 32.

Referring to FIG. 1, top wall 22 contains a top door 144 locked in the closed position. Top door 144 is hinged along edge 22a of top wall 22 to allow the pet owner to access cage interior 34 from top wall 22 of cage 20. Further, because top door 144 is hinged along edge 22a, the door can be placed in an open position so that it can be folded to rest flush against sidewall 28 to allow the cage 22 to be used as a "puppy pen" or to allow cage 22 to be stored against a room wall with top door 144 open. Door 144 is locked by at least one locking mechanism 145, which operates identically to pass through door locking mechanism 67, as previously explained.

Figure 8:
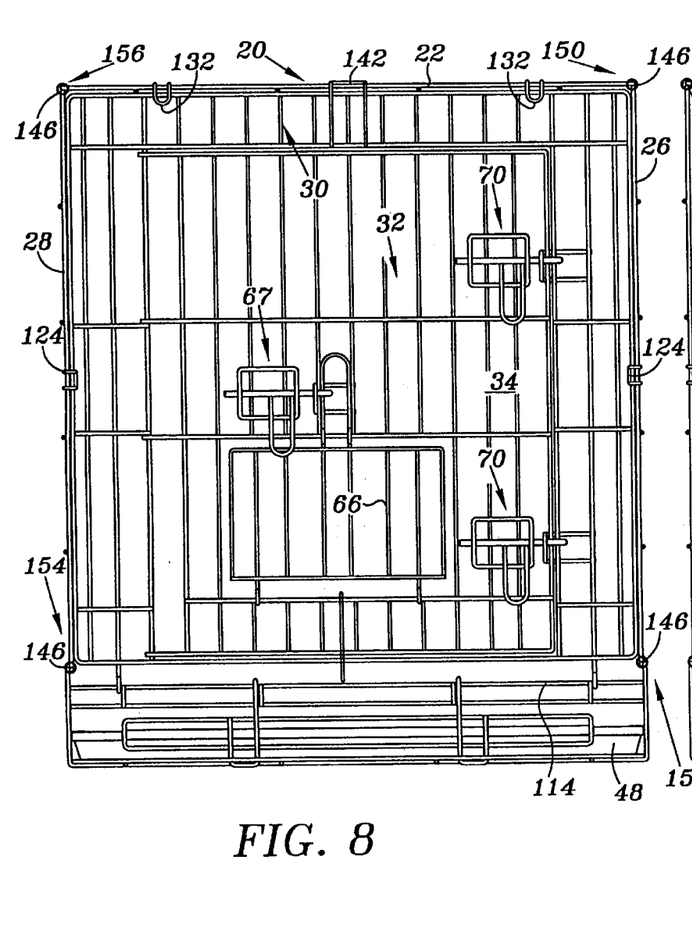
FIG. 8 is a front elevation view showing the entrance door closed and in the locked position.
Figure 9:
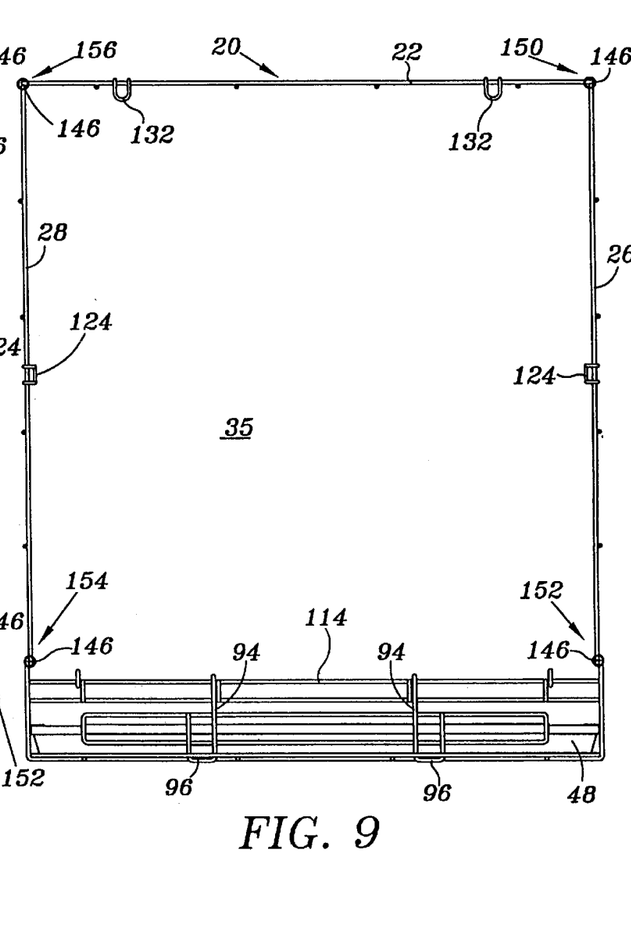
FIG. 9 is a front elevation view of FIG. 8 with the front wall folded inside the cage interior.
Figures 12, 13:
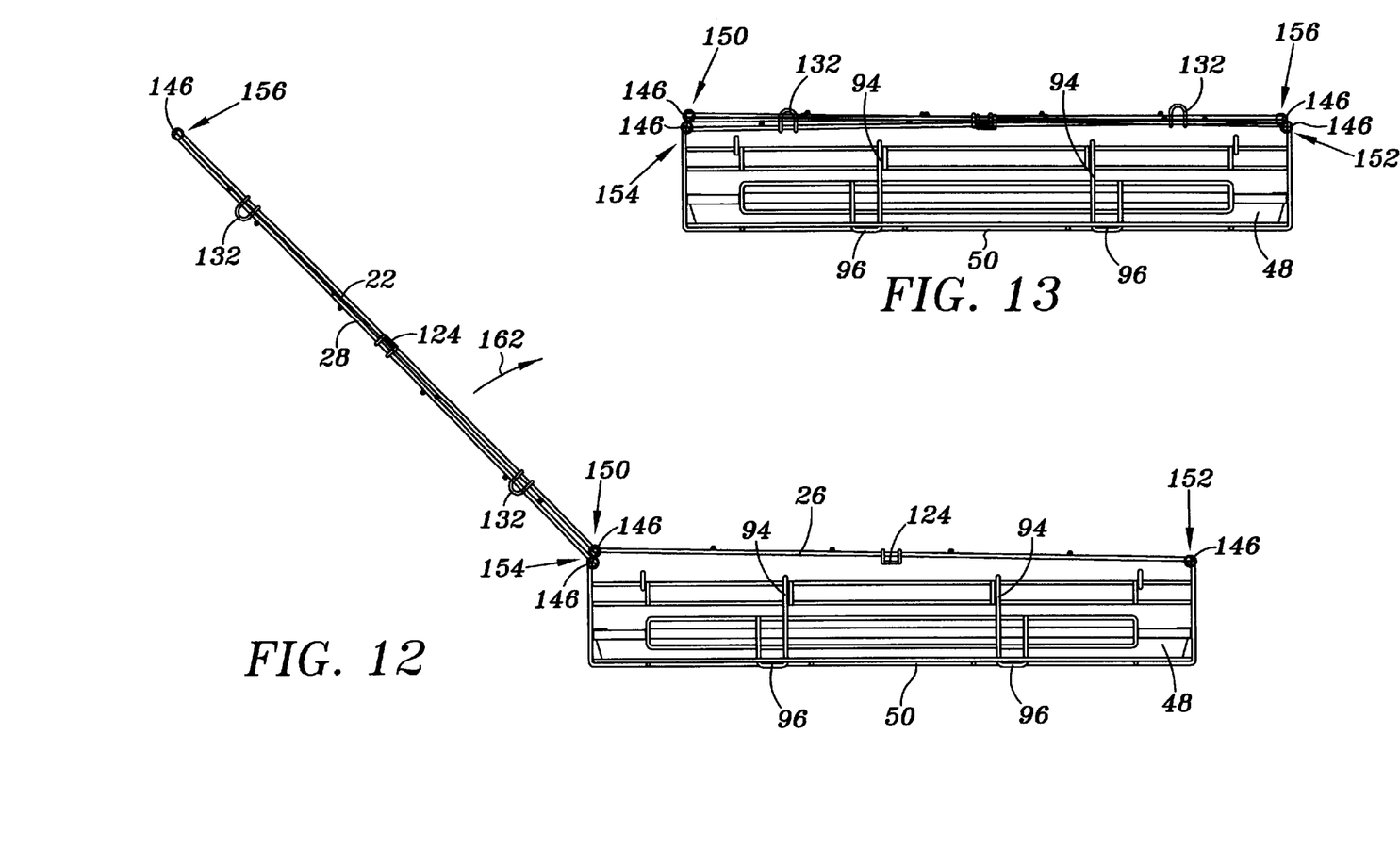
FIG. 12 is a side elevation view showing a sidewall and the top surface rotating to a vertical position.
FIG. 13 is a side elevation view showing the kennel cage in the folded position.

FIGS. 8–12 illustrate kennel 20 collapsing from the expanded position (FIG. 1) to the folded position (FIG. 13). Referring to FIG. 8, cage 20 is configured in the expanded position with front wall 30 upright and attached to top wall 22. When the pet owner desires to fold cage 20, front wall 30 is detached from top wall 22 by pulling outward on wall 30 to slide top hook 142 away from top wall 22. Once hook 142 is separated from top wall 22, an upward force can be applied to top wall 22 so that wire locks 132 will detach from front wall 30. The upward force on top wall 22 is maintained to prevent latch 138 from contacting top wall 22 as wall 30 rotates around bottom edge 114 and inside cage interior 34. Latches 124 are disconnected from wall 30. Rotation occurs until wall 30 is horizontally positioned above and parallel to bottom wall 50. The same configuration and unlocking procedure is followed for rear end wall 32. Because front and rear walls 30 and 32 contain rounded sides, the walls 30 and 32 can be easily rotated to the collapsed position without catching or hooking to sidewalls 26 and 28. The rounded sides of walls 30 and 32 enable walls 30 and 32 to slide over walls 26 and 28 while collapsing.

After disconnecting ends 30 and 32 from top wall 22, first sidewall 26, second sidewall 28 and top wall 22 begin transition to the folded position as seen in FIG. 10. Top wall 22, bottom portion 24 and walls 26 and 28 are interconnected at corners 150, 152, 154 and 156 by hollow slit cylindrical members 146. Referring specifically to corner 150, cylindrical member 146 is a tubular member having a diameter large enough to connect edge portions of top wall 22 and sidewall 26. Cylindrical members 146 should have a diameter slightly larger than the combined diameters of the edges of top surface 22 and sidewall 26 provide a loose tolerance to allow the walls to rotate and pivot with respect to each other. Similar tolerances and configurations can be seen in corners 152, 154 and 156 to provide pivotability at each corner.

After top wall 22 and walls 26 and 28 continue to rotate in the direction of arrow 160, each wall 22, 26 and .28 will reach a generally parallel position with respect to each other and bottom wall 50, as seen in FIG. 11. When walls 22, 26, and 28 are positioned horizontally, sidewall 28 and top wall 22 are rotated clockwise in the direction of arrow 162, as seen in FIG. 12. Rotation will continue until top wall 22 and sidewall 28 are folded horizontally above bottom portion 24 in the folded position, as seen in FIG. 13. When collapsed walls 26 and 28 and top wall 22 are locked in position by a clamp mechanism 148 (FIG. 1), where the clamp mechanism prevents top wall 22 and walls 26 and 28 from moving from the collapsed position as the cage 20 is transported and/or. stored.

When a user desires to erect cage 20 from the folded position to the expanded position, the above-mentioned steps are performed in reverse order. Top wall 22 and sidewall 28 are rotated counter-clockwise approximately 120 degrees, as seen in FIG. 12. In this position, sidewall 26 is next rotated clockwise around corner 152 to raise sidewall 26 above bottom portion 24 until sidewall 26 is parallel with sidewall 28 (FIG. 10). In this position, sidewalls 26 and 28 are rotated clockwise until both walls are standing vertical (FIG. 9) to form an open ended enclosure 35 formed by top wall 22 and side walls 26 and 28. Once sidewalls 26 and 28 are positioned vertically, first and second end walls 30 and 32 are rotated from their horizontal position on top of bottom portion 24 until reaching a near vertical position. Rotation of front and rear walls 30 and 32 is facilitated due to rounded sides 120 and 122 because the rounded surfaces slide past the wire support of side walls 26 and 28. While in this position, the user must apply a slight upward force to top wall 22 to allow sufficient clearance for latch 138 to slide under the top surface and for top edge 112 to align and fit inside top wall wire locks 132. Once top edge 112 is aligned in wire locks 132, the upward force on top wall 22 is then removed. While rotating walls 30 and 32, the user must pay particular attention so that first and second side edges 116 and 118 (FIG. 2) are received by sidewall latches 124. Once front and rear walls 30 and 32 are aligned and positioned inside latches 124 and locks 132 and latches 138 are aligned above top wall 22, the cage is fully assembled in the expanded position and ready for use.

Alternatively, placement of cage 20 between the folded and expanded positions can be performed by detaching hollow cylindrical members 146 at any of the corners 150, 152, 154 and 156 such that first sidewall 26, second sidewall 28 and top wall 22 can be completely separated, stacked and/or rotated above bottom portion 24, if so desired by the pet owner.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

We claim:

1. A cage for housing an animal, the cage comprising:

a top wall;

a bottom wall spaced apart from said top wall;

first and second spaced apart sidewalls;

a front wall;

a rear wall spaced apart from said front wall;

an entrance door disposed in at least one of said walls and being moveable between an open and closed position;

a pass through door disposed in said entrance door and being moveable between an open position and a closed position, such that said pass through door is moveable to said open position when said entrance door is moved to said closed position; and said top wall includes a top door moveable between an open and closed position and rotatable mounted along a top wall side edge such that when said top door is in said open position, said top door is disposed adjacent to said one of said sidewalls.

2. The cage of claim 1 wherein said bottom wall supports a removable pan.

3. The cage of claim 1 wherein said entrance door contains a locking mechanism for locking and unlocking said entrance door and for preventing said pass through door from moving to said open position unless said entrance door is in said closed position.

4. The cage of claim 1 wherein said front and rear walls contain rounded sides.

5. A collapsible cage for housing an animal, the collapsible cage having an expanded position and a folded position, the cage comprising:

a top wall and a bottom wall;

a first sidewall having a bottom edge and a top edge wherein said bottom edge engages said cage bottom wall and said top edge engages said cage top wall;

a second sidewall having a bottom edge and top edge wherein said bottom edge engages said cage bottom wall and said top edge engages said cage top wall;

a front wall having a bottom edge, a top edge and first and second sides wherein said bottom edge thereof rotatably engages said bottom wall;

said front wall includes a first curved, bent portion disposed between said top edge and said bottom edge thereof and extending accurately from said front wall first side to said first sidewall in the cage expanded position;

said front wall includes a second curved, bent portion disposed between said top edge and said bottom edge thereof and extending accurately from said front wall second side to said second sidewall in the cage expanded position;

a rear wall having a bottom edge, a top edge and first and second sides wherein said bottom edge thereof rotatably engages said bottom wall;

said rear wall includes a first curved, bent portion disposed between said top edge and said bottom edge thereof and extending accurately from said rear wall first side to said first sidewall in the cage expanded position;

said rear wall includes a second curved, bent portion disposed between said top edge and said bottom edge thereof and extending accurately from said rear wall second side to said second sidewall in the cage expanded position;

wherein said front and rear walls are disposed parallel to each other and said first and second sidewalls are disposed parallel to each other and interconnected between said top wall and said bottom wall and said front wall, rear wall, and sidewalls being disposed generally perpendicular to said top wall and said bottom wall in the cage expanded position;

wherein said top wall, said first and second sidewalls and said front and rear walls are foldable above said bottom wall in the cage folded position; and wherein during transition from the folded position to the expanded position, said first and second sidewalls are perpendicularly disposed to and connected to said top wall and said bottom wall to form an open ended enclosure and said front and rear walls are rotated from inside said open ended enclosure to a position perpendicularly disposed to said top and bottom walls, wherein during rotation said curved portions of said front and rear walls slide over said first and second sidewalls.

6. The cage of claim 5 wherein said bottom wall further includes a receiving area for holding a removable pan wherein said receiving area is defined by said bottom wall, a pair of spaced apart and parallel sidewalls connected to a pair of spaced apart front and rear walls.

7. The cage of claim 5 wherein the cage further includes an entrance door disposed in at least one of said walls and moveable between an open and closed position.

8. The cage of claim 7 wherein said entrance door further includes a pass through door moveable between an open and closed position such that said pass through door is moveable to said open position when said entrance door is moved to said closed position.

9. The cage of claim 5 wherein said top wall includes a top door moveable between an open and closed position and rotatably mounted along a top surface side edge such that when said top door is in said open position, said top door is disposed adjacent to said one of said side walls.

10. The cage of claim 6 wherein said bottom wall contains an extension to support and elevate the bottom wall above a support surface.

11. The cage of claim 10 wherein said extension is covered with an anti-scraping material to prevent the cage from scratching said support surface.

12. The cage of claim 11 wherein said anti-scraping material is rubber.

13. The cage of claim 7 sand further including a lock operable between a locked position and an unlocked position for locking said entrance door, said front wall having a slot, said lock including:
   a latch having first and second ends, said first end including a curvilinear portion;
   a support for slidably mounting said latch to said entrance door;
   a handle mounted to said latch between said first and second end thereof, said handle being moveable between a locked position generally parallel to said front wall and rotatable to a position generally perpendicular to said front wall to slidably remove said latch from said front wall slot to said locked or unlocked position; and
   a keeper mounted to said front wall having an aperture for receiving said latch in said locked position and said front wall slot receiving said curvilinear portion of said latch in said locked position.

14. The cage of claim 13 wherein said entrance door further includes a Pass through door moveable between an open and closed position, such that said pass through door is moveable to said open position when said entrance door is moved to said closed position said pass through door positioned in said open position only when said lock is in said locked position to prevent a pet from escaping through said entrance door when servicing said cage interior.

15. A cage for housing an animal, the cage having an expanded position and a folded position, the cage comprising:
   a top wall and a bottom wall;
   a first sidewall having a bottom edge and a top edge wherein said bottom edge engages said cage bottom wall and said top edge engages said cage top wall;
   a second sidewall having a bottom edge and top edge wherein said bottom edge engages said cage bottom wall and said top edge engages said cage top wall;
   a front wall having a bottom edge, a top edge and rounded sides wherein said bottom edge rotatably engages said bottom wall;
   a rear wall having a bottom edge, a top edge and rounded sides wherein said bottom edge rotatably engages said bottom wall;
   wherein said front and rear walls are disposed parallel to each other and said first and second sidewalls are disposed parallel to each other and interconnected between said top wall and said bottom wall and said front wall, rear wall, and sidewalls being disposed generally perpendicular to said top wall and said bottom wall in the cage expanded position;
   wherein said top wall, said first and second sidewalls and said front and rear walls are foldable above said bottom wall in the cage folded position;
   wherein during transition from the folded position to the expanded position, said first and second sidewalls are perpendicularly disposed to and connected to said top wall and said bottom wall to form an open ended enclosure and said front and rear walls are rotated from inside said open ended enclosure to a position perpendicularly disposed to said top and bottom walls, wherein during rotation said rounded sides of said front and rear walls slide over said first and second sidewalls;
   said cage further includes an entrance door disposed in at least one of said walls and moveable between an open and closed position; and
   said entrance door further includes a pass through door moveable between an open and closed position such that said pass through door is moveable to said open position when said entrance door is moved to said closed position.

16. The cage of claim 15 wherein said top wall includes a top door moveable between an open and closed position and rotatably mounted along a top wall side edge such that when said top door is in said open position, said top door is disposed adjacent to said one of said side walls.

17. The cage of claim 15 wherein said front and rear walls are locked in the expanded position by a wire lock located on said top wall wherein said wire lock comprises a slot to positively engage and hold said front and rear wall top edges such that said first and second sidewalls are prevented from being collapsed inside said cage interior or pushed away from said cage interior.

18. The cage of claim 17 wherein said front and rear walls each contain a latch wherein said latch is attached to said front wall top edge and said rear wall top edge wherein said latch extends over said top wall to prevent said top wall from separating from said front and rear walls while in the expanded position.

19. The cage of claim 15 wherein said bottom wall further includes a receiving area for holding a removable pan wherein said receiving area is defined by said bottom wall, a pair of spaced apart and parallel sidewalls connected to a pair of spaced apart front and rear walls.

20. The cage of claim 19 wherein a channel lock mounts to said receiving area front wall, rear wall and sidewalls to guide and secure said pan above said bottom wall whereby said channel lock contains a vertical member to prevent said pan from moving.

21. The cage of claim 20 wherein said receiving area front wall contains a door moveable between an open position and a closed position such that when said door is in said open position, said pan can be inserted or removed from inside said receiving area.

22. The cage of claim 21 wherein said bottom wall contains an extension to support and elevate said bottom wall above a support surface.

23. The cage of claim 22 where in said extension is covered with an anti-scraping material to prevent the cage from scratching said support surface.

24. The cage of claim 23 wherein said anti scraping material is rubber.

25. The cage of claim 15 and further including a lock operable between a locked position and an unlocked position for locking said entrance door, said front wall having a slot, said lock including:
   a latch having first and second ends, said first end including a curvilinear portion;
   a support for slidably mounting said latch to said entrance door;
   a handle mounted to said latch between said first and second end thereof said handle being moveable between a locked position generally parallel to said front wall and rotatable to a position generally perpendicular to said front wall to slidably remove said latch from said front wall slot to said locked or unlocked position;
   a keeper mounted to said front wall having an aperture for receiving said latch in said locked position said front wall including a slot for receiving said curvilinear portion of and latch in said locked position.

26. The cage of claim 25 wherein said pass through door can be positioned in the open position only when said lock is in said locked position to prevent a pet from escaping through said entrance door when servicing said cage interior.

27. A collapsible cage for housing an animal, the collapsible cage having an expanded position and a folded position, the cage comprising:
   a top wall and a bottom wall;
   a first wall having a bottom edge and a top edge wherein said bottom edge thereof engages said bottom wall and said top edge thereof engages said top wall;
   a second wall having a bottom edge and top edge wherein said bottom edge thereof engages said bottom wall and said top edge thereof engages said top wall;
   a third wall having a bottom edge, a top edge and rounded sides wherein said bottom edge thereof rotatably engages said bottom wall;
   a fourth wall having a bottom edge, a top edge and rounded sides wherein said bottom edge thereof rotatably engages said bottom wall;
   wherein said first and second walls are disposed parallel to each other and said third and fourth walls are disposed parallel to each other and interconnected between said top wall and said bottom wall, said first, second, third and fourth walls being disposed generally perpendicular to said top wall and to said bottom wall in the cage expanded position;
   wherein said top wall, said first, second, third and fourth walls are foldable above said bottom wall in the cage folded position;
   wherein during transition from the cage folded position to the cage expanded position, said first and second walls are perpendicularly disposed to and connected to said top wall and to said bottom wall to form an open ended enclosure and said third and fourth walls are rotated from inside said open ended enclosure to a position perpendicularly disposed to said top and bottom walls, wherein during rotation said rounded sides of said third and fourth walls slide over said first and second walls;
   at least one of said walls includes an entrance door moveable between an open and closed position; and
   said entrance door further includes a pass through door moveable between an open and closed position, such that said pass through door is moveable to said open position when said entrance door is moved to said closed position.

28. A cage for housing an animal, the cage comprising:
   a top wall;
   a bottom wall spaced apart from said top wall;
   first and second spaced apart sidewalls;
   a front wall;
   a rear wall spaced apart from said front wall;
   an entrance door disposed in at least one of said walls and being moveable between an open and closed position;
   a pass through door disposed in said entrance door and being moveable between an open position and a closed position, such that said pass through door is moveable to said open position when said entrance door is moved to said closed position; and
   said bottom wall supports a removable pan;
   wherein said top wall includes a top door moveable between an open and closed position and rotatably mounted along a top wall side edge such that when said top door is in said open position, said top door is disposed adjacent to said one of said side walls.

29. The cage of claim 28 wherein said entrance door contains a locking mechanism for locking and unlocking said entrance door and for preventing said pass through door from moving to said open position unless said entrance door is in said closed position.

30. The cage of claim 28 wherein said front and rear walls contain rounded sides.

31. A cage for housing an animal, the cage comprising:
   a top wall;
   a bottom wall spaced apart from said top wall, said bottom wall including an extension to support and elevate the cage above a support surface and said bottom wall supports a removable pan;
   first and second spaced apart sidewalls;
   a front wall;
   a rear wall spaced apart from said front wall;
   an entrance door disposed in at least one of said walls and being moveable between an open and closed position; and
   a pass through door disposed in said entrance door and being moveable between an open position and a closed position, such that said pass through door is moveable to said open position when said entrance door is moved to said closed position.

32. The cage of claim 31 wherein said top wall includes a top door moveable between an open and closed position and rotatably mounted along a top wall side edge such that when said top door is in said open position, said top door is disposed adjacent to said one of said side walls.

33. The cage of claim 31 wherein said extension is covered with an anti-scraping material to prevent the cage from scratching said support surface.

34. The cage of claim 33 wherein said anti-scraping material is rubber.

35. The cage of claim 31 wherein said entrance door contains a locking mechanism for locking and unlocking said entrance door and for preventing said pass through door from moving to said open position unless said entrance door is in said closed position.

36. The cage of claim 31 wherein said front and rear walls contain rounded sides.

37. A cage for housing an animal, the cage comprising:
   a top wall;
   a bottom wall spaced apart from said top wall;
   first and second spaced apart sidewalls;
   a front wall;
   a rear wall spaced apart from said front wall;
   an entrance door disposed in at least one of said walls and being moveable between an open and closed position;
   a pass through door disposed in said entrance door and being moveable between an open position and a closed position, such that said pass through door is moveable to said open position; and
   said entrance door contains a locking mechanism for locking and unlocking said entrance door and for preventing said pass through door from moving to said open position unless said entrance door is in said closed position.

38. The cage of claim 37 wherein said top wall includes a top door moveable between an open and closed position and rotatably mounted along a top wall side edge such that when said top door is in said open position, said top door is disposed adjacent to said one of said side walls.

39. The cage of claim 37 wherein said front and rear walls contain rounded sides.

40. A cage for housing an animal, the cage comprising:
   a top wall;
   a bottom wall spaced apart from said top wall;
   first and second spaced apart sidewalls;
   a front wall having rounded sides;
   a rear wall having rounded sides and spaced apart from said front wall;
   an entrance door disposed in at least one of said walls and being moveable between an open and closed position; and
   a pass through door disposed in said entrance door and being moveable between an open position and a closed position, such that said pass through door is moveable to said open position when said entrance door is moved to said closed position.

41. The cage of claim 40 wherein said top wall includes a top door moveable between an open and closed position and rotatably mounted along a top wall side edge such that when said top door is in said open position, said top door is disposed adjacent to said one of said side walls.

42. The case of claim 40 wherein said bottom wall supports a removable pan.

* * * * *

UNITED STATES PATENT AND TRADEMARK OFFICE
CERTIFICATE OF CORRECTION

PATENT NO. : 6,681,720 B1
DATED : January 27, 2003
INVENTOR(S) : Scott A. Skurdalsvold et al.

It is certified that error appears in the above-identified patent and that said Letters Patent is hereby corrected as shown below:

Column 4,
Line 61, replace "members .74" with -- members 74 --.

Column 6,
Line 67, replace "and .28" with -- and 28 --.

Column 7,
Line 12, replace "and/or.stored." with -- and/or stored. --.

Column 8,
Line 5, replace "and rotatable" with -- and rotatably --.
Lines 34, 39, 47 and 52, replace "accurately" with -- arcuately -- .

Signed and Sealed this

Sixteenth Day of March, 2004

JON W. DUDAS
*Acting Director of the United States Patent and Trademark Office*